United States Patent
Vescovi et al.

(10) Patent No.: US 8,153,553 B2
(45) Date of Patent: Apr. 10, 2012

(54) GAS SORBING COMPOSITE SYSTEMS AND METHODS FOR THEIR MANUFACTURING

(75) Inventors: Chiara Vescovi, Venegono Inferiore VA (IT); Lorena Cattaneo, Busto Arsizio VA (IT); Roberto Giannantonio, Oleggio NO (IT); Giorgio Longoni, Monza MI (IT)

(73) Assignee: Saes Getters S.p.A., Lainate MI (IT)

( * ) Notice: Subject to any disclaimer, the term of this patent is extended or adjusted under 35 U.S.C. 154(b) by 915 days.

(21) Appl. No.: 12/158,466

(22) PCT Filed: Dec. 22, 2006

(86) PCT No.: PCT/IT2006/000873
§ 371 (c)(1),
(2), (4) Date: Jun. 20, 2008

(87) PCT Pub. No.: WO2007/074494
PCT Pub. Date: Jul. 5, 2007

(65) Prior Publication Data
US 2008/0312072 A1    Dec. 18, 2008

(30) Foreign Application Priority Data
Dec. 27, 2005   (IT) ................................. MI05A2496

(51) Int. Cl.
*B01J 20/00* (2006.01)
(52) U.S. Cl. .................. 502/411; 502/401; 422/168
(58) Field of Classification Search ................. 502/401, 502/402, 407, 411; 422/168
See application file for complete search history.

(56) References Cited

U.S. PATENT DOCUMENTS

| 3,704,806 | A | 12/1972 | Plachenov et al. |
| 4,081,397 | A | 3/1978 | Booe |
| 5,304,419 | A | 4/1994 | Shores |
| 5,591,379 | A | 1/1997 | Shores |
| 5,804,917 | A | 9/1998 | Takahashi et al. |
| 5,882,761 | A | 3/1999 | Kawami et al. |
| 6,226,890 | B1 | 5/2001 | Boroson et al. |
| 6,524,372 | B1 * | 2/2003 | Corriu et al. ..................... 95/138 |
| 6,534,649 | B1 * | 3/2003 | Denat et al. ................... 540/452 |
| 6,819,042 | B2 | 11/2004 | Nakada et al. |

FOREIGN PATENT DOCUMENTS

| JP | 61-291021 | 12/1986 |
| JP | 2000281998 | 10/2000 |
| JP | 2005029768 | 2/2005 |

OTHER PUBLICATIONS

Pradyot A. Agaskar, "Facile, High-Yield Synthesis of Functionalized Spherosilicates: Precursors of Novel Organolithic Macromolecular Materials", Inorg. Chem. No. 29, pp. 1603, (1990).
Pradyot A. Agaskar, "Functionalized spherosilicates: soluble precursors of inorganic/organic hybrid materials", Colloids and Surfaces, No. 63, pp. 131-138, (1992).

* cited by examiner

*Primary Examiner* — Edward Johnson
(74) *Attorney, Agent, or Firm* — Panitch Schwarze Belisario & Nadel LLP

(57) ABSTRACT

A gas sorbing system is formed by gas sorbing components which are dispersed in a polymeric matrix which is porous or permeable to the gases to be sorbed. The gas sorbing components include a central nucleus, selected among a silica particle, polyhedral oligomeric silsesquioxane and a spherosilicate, to which there are bound at least one organic or metalorganic radical carrying a functional group, which is able to chemically fix the gas to be sorbed, and at least one anchoring organic radical including a chain of carbon atoms, which has the functionality of fixing the nucleus in the matrix polymer.

35 Claims, No Drawings

GAS SORBING COMPOSITE SYSTEMS AND METHODS FOR THEIR MANUFACTURING

CROSS-REFERENCE TO RELATED APPLICATIONS

This application is a Section 371 of International Application No. PCT/IT2006/000873, filed Dec. 22, 2006, which was published in the English language on Jul. 5, 2007, under International Publication No. WO 2007/074494 A1 and the disclosure of which is incorporated herein by reference.

BACKGROUND OF THE INVENTION

The present invention relates to gas sorbing composite systems, as well as to methods for their manufacture.

Gas sorbing systems and materials are widely used in industry in all applications where it is necessary to maintain a vacuum or to control the composition of the gaseous atmosphere by the removal of traces of undesired gases, particularly in displays being used as screens for television, computers, or in many other electronic applications, such as hand held computers, mobile phones and the like. A particularly important case of displays is the OLEDs (Organic Light Emitting Diodes), being described for instance in U.S. Pat. Nos. 5,804,917 and 5,882,761, and in particular those belonging to the latest generation, known as "Top Emission OLED" (TOLED). In the latter, it is foreseen that the light leaves the device passing through the surface which is opposed to the one where the system responsible for forming the image is located, that is from the surface most suitable for housing the getter system. In this case, the getter system obviously must be transparent. Because of their importance, particular reference will be made in the following to these latter type of displays, but the teachings of the invention have a more general applicability, for instance in the case of plasma screens.

Gas sorbing materials used in industry are normally inorganic compounds in a finely dispersed form, in order to increase the specific surface (surface area per weight unit) and thus the capability and speed of interaction with the surrounding gaseous environment. Examples of these materials are alkaline-earth metal oxides, such as CaO and BaO (for moisture sorption), zeolites (for the sorption of different gases, such as moisture, carbon oxides or others, depending on the specific zeolite being used), aluminas or the like. A common problem of these materials is that powders are not provided with sufficient cohesion, such as to form compact bodies. This is particularly true in the case of desiccants after moisture sorption.

The problem is normally addressed by dispersing the sorbing material within a dispersant matrix, which is able to keep material particles in a fixed position, while at the same time allowing gases to pass toward the getter itself. Examples of this solution are reported in numerous documents. Japanese patent application publication JP 61-291021 discloses desiccant materials dispersed in a silicone matrix; U.S. Pat. No. 3,704,806 discloses desiccant compositions comprising zeolites dispersed within a matrix consisting of a thermosetting polymer, such as epoxy resins; U.S. Pat. No. 4,081,397 discloses a desiccant system comprising alkaline-earth metal oxide particles dispersed in an elastomeric polymer; U.S. Pat. No. 5,304,419 discloses desiccant compositions comprising a desiccant material dispersed in a matrix, which can consist of silicone, polyurethanes or similar polymers; U.S. Pat. No. 5,591,379 discloses desiccant compositions comprising a desiccant selected among zeolites, alumina, silica gel, alkaline earth metal oxides, and alkaline metal carbonates, the desiccant being dispersed in a matrix of porous glass or ceramic; U.S. Pat. No. 6,226,890 B1 discloses desiccant systems, wherein a desiccant material (e.g., an alkaline-earth metal oxide) is dispersed in a polymer which in the patent is said to have the property of not decreasing or even increasing water sorption speed by the desiccant material, which may be, for instance, silicones, epoxies, polyamides, polymethacrylates or others; and finally, U.S. Pat. No. 6,819,042 B2 discloses desiccant systems consisting of a desiccant material being dispersed in a resin, for instance selected from polyethylene, polypropylene, polybutadiene and polyisoprene.

A first generic drawback occurring with the known sorbing systems resides in the manufacturing thereof. When moisture sorbers, such as alkaline-earth metal oxides, are employed, particles which are moist due to exposure to air tend to adhere to each other. This degrades their characteristics, and therefore they do no longer have the granulometry and the homogeneous distribution, which are desired in the final sorbing system.

Further, these systems are generally formed by suspending the particles of the sorbing material in the material which will form the matrix when it is still liquid (for example, an organic material before polymerization or a molten polymer). The different densities and surface energies of particles and matrix material may cause de-mixings in the suspension, unless the system is kept under continuous stirring, at least from the time of the formation of the suspension until the matrix reaches a viscosity sufficient to prevent the sedimentation of the solid particles. However, this represents an evident complication of the manufacturing processes for these systems.

Further, systems comprising a matrix, obtained by the above described processes, will have sorbing particles that will show a tendency to aggregate during the matrix consolidation.

In addition, when a certain sorbing system is given and it is desired to modify the sorption characteristics thereof, in particular sorbable gases, it is necessary to provide a new preparation by changing the nature of the sorbing particle. This generally involves the need to undertake from the beginning the study of the Theological properties of the system and of how these evolve during the manufacturing thereof, in order to ensure the achievement of a homogeneous and stable particle dispersion.

Finally, as a consequence of gas sorption, these systems may change their overall physical properties, particularly optical ones, such as the refraction index or the light radiation absorption, due to chemical-physical variations of the sorbing particles. This last point is particularly critical. In fact, the getter systems of the prior art do not have optical properties that guarantee their satisfactory use in the previously mentioned TOLED screens.

BRIEF SUMMARY OF THE INVENTION

An object of the present invention is to provide gas sorbing systems which overcome the drawbacks of the prior art.

This and other objects are achieved according to the present invention by a gas sorbing system comprising gas sorbing components dispersed in a permeable dispersant comprising a polymeric matrix, which is porous or permeable to the gases to be sorbed, characterized in that the gas sorbing components comprise a central nucleus, which can be selected among a silica particle, a polyhedral oligomeric silsesquioxane and a spherosilicate, to which there are bound at least one organic or metalorganic radical carrying a functional group, which is able to chemically fix the gas to be sorbed, and at least one anchoring organic radical comprising a chain of carbon atoms having the functionality of fixing the nucleus in the matrix polymer.

The anchoring organic radical is capable of keeping the nucleus in a fixed position with respect to the polymeric matrix through Van der Waals interactions, hydrogen bonds, covalent bonds, or ionic interactions.

The polymeric matrix can be made of any polymeric material which is permeable to the gaseous species to be sorbed. Preferably, this polymer exhibits adhesive characteristics, so as to be able to be fixed to an inner wall of the receiving device without the need to use additional adhesives.

In general, in order to achieve a permeable dispersant, polymers and manufacturing processes thereof are preferably selected among those allowing achievement of maximum free volume of the polymeric medium, maximum order and regularity of the polymer chains, minimum cross-linking grade, minimum packing density, and maximum interactions with permeant species.

Suitable polymers for the achievement of a permeable dispersant are, for example, polyacrylates and polymethacrylates, polyetherimides (PEI), polyamides (PA), cellulose acetate (CA), cellulose triacetate (TCA), polysiloxanes (also known as silicones), polyvinyl alcohol (PVAL), polyethylene oxide (PEO), polyethylene glycol (PEG), polypropylene glycol (PPG), polyvinylacetate (PVAC), polyethylene-vinyl alcohol copolymers, and PA-PEO and polyurethane-PEO copolymers. In order to achieve a high diffusion of gas toward the sorbing component the polymeric matrix of the systems of the invention may also be porous. In this specific case, the suitable polymers list is very wide, because limitations bound to permeability are missing.

The gas sorbing components of the invention are formed by a central nucleus to which at least two organic radicals having different functionalities are bound, with possibly further organic radicals which give the sorbing component desired auxiliary functionalities, as detailed in the following.

DETAILED DESCRIPTION OF THE INVENTION

The first essential functionality of the components of the invention is the gas sorption. The organic radical expressing this functionality carries a functional group being able to chemically fix the gas to be sorbed. The exact nature of the functional group depends on the gas to be sorbed. In case the gas to be sorbed is water, the functional group can be selected among epoxy groups, (activated) double and triple bonds, organic anhydrides, linear and cyclic alkoxides, isocyanate groups, isothiocyanate groups, and metalorganic groups being easily hydrolysable, such as alkoxysilanes and metal alkoxides.

In case the gas to be sorbed is oxygen, functional groups can be selected among phenols, amines (preferably aromatic), thioethers, aldehydes, and tertiary carbon atoms.

In case the gas to be sorbed is CO, functional groups can be selected among unsaturated bonds, amino and ketone groups in the presence of lithium-based organometallic compounds.

The second essential functional group of the components of the invention is an organic radical comprising a chain of carbon atoms, which has the function of an anchoring agent in the matrix polymer as mentioned above, thus ensuring miscibility of the component within the matrix, stability of the solutions or suspensions of the component in solutions of solvents and monomers or oligomers provided prior to polymer formation, and a uniform spatial dispersion of nuclei during the consolidation of the polymeric matrix.

The chemical nature of this chain depends on the components of the initial solutions, from which the matrix polymer is obtained. Generally, in case the initial solutions or suspensions comprise non-polar solvents and monomers such as hydrocarbons or ethers, the chain can comprise a hydrocarbon radical. In contrast, in the case of polar solvents and monomers, such as alcohols or ketones, the chain can carry polar groups, such as alcoholic groups, carbonyl groups, acids, salts (e.g., salts of carboxylic acids, such as the so called "fatty acids"), amines or the like.

Organic radicals having a high affinity to monomers will preserve such affinity also toward the final polymeric matrix. For instance, in case the polymer is polyvinyl alcohol or a polyamide, the radical can carry hydroxyl groups, in case the polymer is polyethylene or polypropylene the radical consists of a hydrocarbon chain, and finally, in case the polymer belongs to the fluoropolymer class (e.g., PTFE, PVDF, PVF, ETFE) the radical carries fluorinated groups (e.g., —$CF_2$—).

The radical can also be bound to the polymeric matrix by a covalent bond. Such a bond can form during reactions of copolymerization with the organic monomer/oligomer, during cross-linking reactions of the polymeric matrix or, finally, during grafting reactions on the matrix.

In the first case, for instance, the radical carries allylic, vinyl or styrene groups which copolymerize with olefins by a radical-based mechanism. An example is the poly-(styryl-POSS-co-styrene) copolymer, obtained by copolymerization of styrene and polyhedral oligomeric silsesquioxanes nuclei functionalized with styrene groups. Polyhedral oligomeric silsesquioxanes, known as POSS® (POSS® is a Hybrid Plastics LLP company trademark), are more widely described in the following. Another possible nucleus can be chosen in the class of spherosilicates.

The radical can also be bound to the polymeric matrix thanks to cross-linking reactions. For instance, by irradiating with ultraviolet radiation a mixture comprising a nucleus having a radical with one or more methacrylic groups, an acrylic resin and a photoinitiator which is sensitive to the radiation, the unsaturated groups of the radical react with the resin thus giving rise to a highly cross-linked polymeric matrix, in which the radical is bound to the dispersant by covalent bonds C—C.

Matrix-radical covalent bonds can be formed also through grafting reactions which occur by radical initiators in solution (where polymer and nuclei are dissolved) or in dry conditions (nuclei and initiator are added to the polymer powder without adding solvents).

Finally, the dispersant polymer matrix may also be formed by a reaction between anchoring chains located on different nuclei, without the need of a further dispersant polymer. For instance, the methacrylates POSS® can polymerize through a radical-based mechanism, thus forming the matrix.

Radicals of the two above described types are linked to a central nucleus, which can be selected among a silica particle, a polyhedral oligomeric silsesquioxane and a spherosilicate. The dimensions of the central nucleus can range between about 10 Å and 100 µm, preferably the dimension is between 100 Å and 10 µm.

Silica particles, forming a first possible type of nuclei of the invention, are generally obtained by reaction in the gaseous state between oxygen and silicon compounds, such as $SiCl_4$, $Si(O—CH_3)_4$ or $Si(O—CH_2—CH_3)_4$. From this reaction, $SiO_2$ particles are obtained having a size on the order of tens of Ångström, which aggregate by electrostatic interaction, thus forming larger size particles. Upon first exposure to (moist) air, these particles are completely covered on the surface by hydroxyl groups —OH. The bond of gas sorbing organic radicals and anchoring agents on this type of nucleus takes place by using the presence of these —OH groups, with reactions such as:

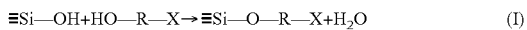

$$\equiv Si-OH + HO-R-X \rightarrow \equiv Si-O-R-X + H_2O \quad (I)$$

wherein the ≡symbol indicates the three bonds of silicon with other atoms of the silica particle, while X indicates the gas sorbing group in case R is the radical having this functionality, or simply a hydrogen atom in case it is the anchoring radical.

The second type of nucleus of sorbing components of the invention is polyhedral oligomeric silsesquioxane molecules, known in chemistry with the POSS® abbreviation. The base structure of these molecules consists of eight silicon atoms located at the vertexes of a cube, wherein each silicon atom is linked to three other silicon atoms by oxygen bridges, while the fourth valency of each silicon is saturated by an organic radical. This general structure can undergo modifications, for instance by opening one or two oxygen bridges and adding further organic radicals in the so formed unsaturated position. Simple and substituted POSS® and processes for the manufacturing thereof are disclosed, for instance, in European and International patent applications EP 1208105, WO 01/46295 and EP 1268635. In this case, the gas sorbing radical and the surfactant radical are directly bound to one of the silicon atoms. These molecules are sold by the Hybrid Plastics LLP company in Hattiesburg, Mass. (US).

The third type of nucleus of sorbing components of the invention is the spherosilicates, having the chemical structure $[ROSiO_{3/2}]_n$, wherein each silicon atom is linked to three other silicon atoms by oxygen bridges and to a further oxygen atom whose other bond is saturated with an organic group. Processes for the manufacture and functionalization of spherosilicates are disclosed, for instance, in Agaskar P. A., *Inorg. Chem.*, 29:1603 (1990), and in Agaskar P. A., *Symposium on the colloidal chemistry of silica*, vol. 63, n. 1-2, pp. 131-138 (1992).

Other functionalities which can be added to the nucleus of the sorbing components of the invention are, for example, gas sorption catalysts and chains which, in case the gas to be sorbed is water, enhance its transport toward the nucleus.

In the case of catalysts, one or more groups having such functionality may be added by bonding it to the nucleus in the same ways previously described. Further, the radical carrying the catalytic functionality will preferably be bound to the nucleus in a position close to the radical carrying the gas sorbing group. This condition guarantees the proximity between the two functions, which is necessary for the catalyst to effectively perform the function of enhancing the reaction of addition of the gaseous molecules to the sorbing functional group. In this way, the catalyst efficiency (that is the rate and the selectivity of the sorption catalytic reaction) is maximized, which is a result that would not occur if the two functionalities were present on disconnected molecules within the matrix, and thus their mutual proximity were dependant in a statistical way on their distribution within the same matrix. In case the gas to be sorbed is water, possible catalysts are Broensted acid groups, for instance the —$SO_3H$ group or the acid catalyst traded under the trademark Nafion® (Du Pont company's trademark) or Lewis acid groups, such as a —$BR_2$ group, where R=H, $C_nH_{2n+1}$. Alternatively, in the case of silica nuclei, the catalyst can be impregnated on the same nucleus. In this case, it is possible to use salts, such as some metal halides ($SnCl_4$, $FeCl_3$, $TiCl_4$).

The other auxiliary functionality that can be added to the sorbing component is that of transporting $H_2O$ molecules toward the sorbing component (when the gas to be sorbed is water). The accessibility of the gas to be removed to the sorbing component is in fact determined by the transport thereof within the matrix, that is, by the gas diffusion coefficient at a given temperature. Such a coefficient, which in the case of the permeable matrixes of the system of the invention is a high one, ensures a good net gas flow reaching the sorbing component. This flow, however, can be increased by concentrating and orienting the same preferably toward the nucleus. This can be achieved by one or more chains exhibiting high affinity to the specific gas, chemically connected to the nucleus and immersed within the matrix. For example, in the case of water, it is possible to use a permeable matrix of polysiloxane and increase the net flow reaching the silica nucleus or the POSS®, by functionalizing these latter with one or more oligoglycols or oligoethers.

In a preferred embodiment, the getter systems of the invention have the further property of being transparent to visible radiation, as previously described. In this way, the systems of the invention prove to be suitable for application in the TOLED type screens previously mentioned.

In this specific case, the dispersant medium is amorphous, while the dispersed nuclei in the polymeric matrix are nanostructured, having a size on the order of about 200 nanometers or lower. The reason for the first of these two additional requirements is that the polymers are transparent only if perfectly crystalline or completely amorphous. As it is essentially impossible to obtain perfectly crystalline polymers, above all in the case of the present invention where a powder has to be dispersed in the medium, it is necessary to use completely amorphous polymers. The second requirement derives from the fact that particles of a size smaller than a half of the shorter visible radiation wavelength (about 400 nm) do not give rise to interaction therewith, and thus do not alter the transparency of the dispersant medium. Preferably, the particles have a size lower than about 100 nm.

In order to meet the first requirement, it is possible to use, for example, the previously mentioned permeable polyacrylates and polymethacrylates, polyetherimides (PEI), polyamides (PA), cellulose acetate (CA), cellulose triacetate (TCA), polysiloxanes (also known as silicones), polyvinyl alcohol (PVAL), polyethylene oxide (PEO), polyethylene glycol (PEG), polypropylene glycol (PPG), polyvinylacetate (PVAC), polyethylene-vinyl alcohol copolymers, and PA-PEO and polyurethane-PEO copolymers, obtained by manufacturing processes suitable to ensure an amorphous structure.

In case a nanoporous polymeric matrix is selected and it has to be transparent, the size of the pores should be smaller than 100 nm, preferably smaller than 80 nm.

In a second aspect thereof, the invention relates to methods of manufacturing the systems which have until now been described. The systems of the invention can be manufactured by forming suspensions of the nuclei in the dispersant medium, if this has a sufficiently low viscosity. As an alternative, it is possible to prepare a suspension of the nuclei in a solvent, wherein it is possible to solubilize also the polymer forming the dispersant medium. Suitable solvents depend on the selected polymer, and are well known in organic chemistry. Examples of solvents are chloroform, acetone, tetrahydrofuran and toluene for polyacrylates and polymethacrylates; formic acid and N-methylpyrrolidone for polyamides; heptane or toluene diethyl ether for polydimethylsiloxane. As an alternative, it is possible to form a suspension between the nuclei and the polymer precursors (e.g. oligomers or monomers which will form the polymer) and cause the in-situ polymer formation, for example by irradiating with UV radiation. Alternatively, it is possible to form a suspension of the nuclei which have polymerized among themselves through the anchoring chains or which are still to be polymerized (in this case the final polymeric matrix coincides with such anchoring chains after they have mutually reacted). Also, in this last case the formation of the dispersant matrix can occur in-situ, for instance by irradiating with UV radiation. The initial solution (if this contains the polymer that provides the dispersant medium or the precursors thereof), or the low-viscosity polymer already having the nuclei therein, can be poured into suitable molds, or can be deposited on an inner surface of the final housing (e.g. an OLED screen), for instance by serigraphy or by common techniques, particularly in the microelectronics industry, and known as spin-coating, dip-coating, spray-coating, or ink-jet printing.

The mixture can be caused to "solidify" (in this case referring to a "solid" as an extremely high-viscosity material, such as to keep a given shape) by extracting the solvent, by on site polymerization, or if the low viscosity was ensured by maintaining the polymer in a molten state, by cooling.

In case it is desired to obtain a nanoporous matrix, it is possible to use one of the techniques which are commonly employed, such as employing so-called porogen agents (e.g. highly branched molecules, such as the ester of benzenetricarboxylic and polyethylene glycol, known in the field with the acronym BTRC-PEG, which decompose thermally, thus generating porosity in the matrix) or the so-called polymer phase separation. In the latter technique the nuclei and the polymer, which is used for creating the dispersant matrix, are mixed with a second polymer, the mixture is deposited on a substrate (e.g. by spin coating) and the obtained layer is subsequently treated with a solvent selective to the second polymer, which dissolves the latter, thus creating a porous structure. If the molecular weights of the initial polymers are suitably selected, it is possible to obtain a nanoporous structure.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A gas sorbing system comprising a gas sorbing component dispersed in a polymeric matrix, the polymeric matrix being porous or permeable to a gas to be sorbed, wherein the gas sorbing component comprises a central nucleus, which is selected among a silica particle, a polyhedral oligomeric silsesquioxane and a spherosilicate, and to which there is bound at least one organic or metalorganic radical carrying a functional group able to chemically fix the gas to be sorbed, and at least one anchoring organic radical comprising a chain of carbon atoms having a functionality of fixing the nucleus in the matrix polymer.

2. The system according to claim 1, wherein for water sorption the functional group is selected among epoxies, activated double and triple bonds, organic anhydrides, linear and cyclic alkoxides, isocyanate, isothiocyanate, and easily hydrolyzable metalorganic groups.

3. The system according to claim 1, wherein for oxygen sorption the functional group is selected among phenols, amines, thioethers, aldehydes, and tertiary carbon atoms.

4. The system according to claim 1, wherein for carbon monoxide sorption the functional group is selected among unsaturated bonds, amino and ketone groups in the presence of organometallic compounds containing lithium.

5. The system according to claim 1, wherein the polymeric matrix comprises a material selected from hydrocarbons and ethers, and wherein the anchoring organic radical is hydrocarbon-based.

6. The system according to claim 1, wherein the polymeric matrix comprises a material selected among alcohols, ketones and amides, and wherein the anchoring radical carries a substituent selected among alcoholic groups, carbonylic groups, acids, salts and amines.

7. The system according to claim 1, wherein the polymeric matrix comprises a fluoropolymer, and the anchoring radical carries fluorinated groups.

8. The system according to claim 1, wherein the anchoring radical is bound to the polymeric matrix by a covalent bond.

9. The system according to claim 8, wherein the covalent bond is obtained by a copolymerization reaction between the anchoring radical and an organic monomer/oligomer.

10. The system according to claim 9, wherein the covalent bond is obtained by a copolymerization reaction between olefins and an anchoring radical which carries allylic, vinyl or styrene groups.

11. The system according to claim 10, wherein the covalent bond is obtained by copolymerization between polystyrene and the molecules known as polyhedral oligomeric silsesquioxane.

12. The system according to claim 10, wherein the covalent bond is obtained by copolymerization between polystyrene and a spherosilicate.

13. The system according to claim 8, wherein the covalent bond is obtained by a cross-linking reaction of the polymeric matrix.

14. The system according to claim 13, wherein the cross-linking reaction is obtained by irradiating with ultraviolet radiation a mixture comprising a nucleus which has a radical with one or more methacrylic groups, an acrylic resin and a photoinitiator sensitive to the radiation.

15. The system according to claim 8, wherein the covalent bond is obtained by a reaction of grafting on the matrix.

16. The system according to claim 15, wherein the grafting reaction is obtained by radical-based initiators in a solution where the matrix polymer and molecules of the anchoring radical are dissolved.

17. The system according to claim 15, wherein the grafting reaction is obtained in dry conditions, in a mixture containing molecules of the anchoring radical, polymer powder and radical-based initiators of the reaction.

18. The system according to claim 8, wherein the polymeric matrix is obtained by polymerization among anchoring chains positioned on different nuclei.

19. The system according to claim 1, wherein the nucleus has a size ranging from 10 Å to 1 μm.

20. The system according to claim 1, further comprising substituents carrying gas sorption catalyst groups bound to the nucleus.

21. The system according to claim 20, wherein, when the gas to be sorbed is water, the catalyst groups are selected from Broensted or Lewis acids.

22. The system according to claim 21, wherein the Broensted acid is selected from an —SO3H group and Nafion.

23. The system according to claim 21, wherein the Lewis acid is a —BR2 group, where R=H, $C_nH_{2n+1}$.

24. The system according to claim 21, wherein, when the nucleus is a silica particle, the catalyst groups comprise a metal halide impregnated to the nucleus.

25. The system according to claim 2, further comprising chains enhancing transport of water molecules to the nucleus, the chains being bound to the nucleus.

26. The system according to claim 25, wherein the chains enhancing the transport of water molecules to the nucleus are selected from oligoglycols and oligoethers.

27. The system according to claim 1, which is gas sorbing and transparent to visible radiation, wherein the polymeric matrix comprises a completely amorphous polymer and the nucleus has a size not larger than about 200 nanometers.

28. The system according to claim 27, wherein the amorphous polymer is selected among polyacrylates, polymethacrylates, polyetherimides, polyamides, cellulose acetate and triacetate, polysiloxanes, polyvinyl alcohol, polyethylene oxide, polyethylene glycol, polypropylene glycol, polyvinylacetate, polyethylene-vinyl alcohol copolymers, polyamide-polyethylene oxide copolymers, and polyurethane-polyethylene oxide copolymers.

29. The system according to claim 28, wherein the matrix is nanoporous having a pore size smaller than 100 nanometers.

30. A method of manufacturing the system of claim 1, comprising preparing a suspension of the gas sorbing components and the matrix polymer or precursors of the polymer in a solvent, and subsequently extracting the solvent.

31. The method according to claim 30, wherein the solvent extraction is carried out after suspension polymerization of the polymer precursors.

32. A method of manufacturing the system of claim 1, comprising preparing a suspension of the sorbing components in the polymer or in precursors of the polymer matrix, maintaining the suspension in liquid phase by heating, and subsequently causing the suspension to solidify by cooling.

33. The method according to claim 32, wherein the solidification by cooling is carried out after the polymerization of the polymer precursors.

34. A method of manufacturing the system of claim 1, comprising preparing a suspension of the sorbing components in precursors of the polymer matrix, and causing the precursors to polymerize by irradiating with UV radiation.

35. A method of manufacturing the system of claim 1, comprising causing the anchoring radicals of the sorbing components to polymerize among themselves.

* * * * *